Dec. 17, 1968     A. M. RUBENSTEIN     3,416,319
PROPULSION SYSTEM
Filed Aug. 20, 1959     2 Sheets-Sheet 1

INVENTOR
ALBERT M. RUBENSTEIN

BY
ATTORNEY

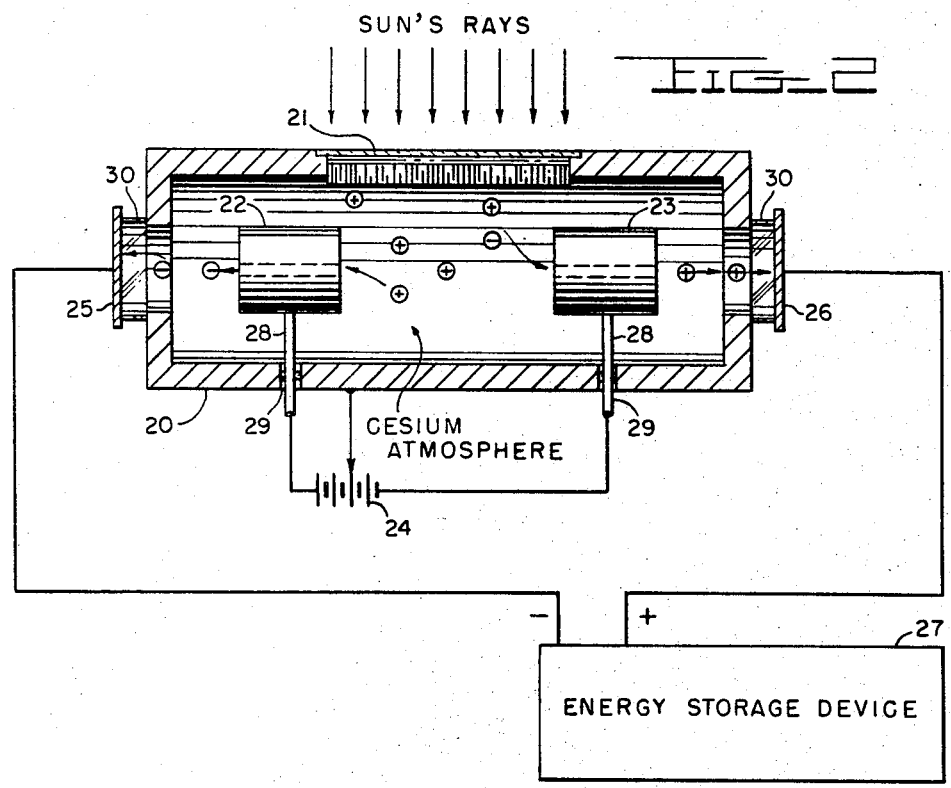
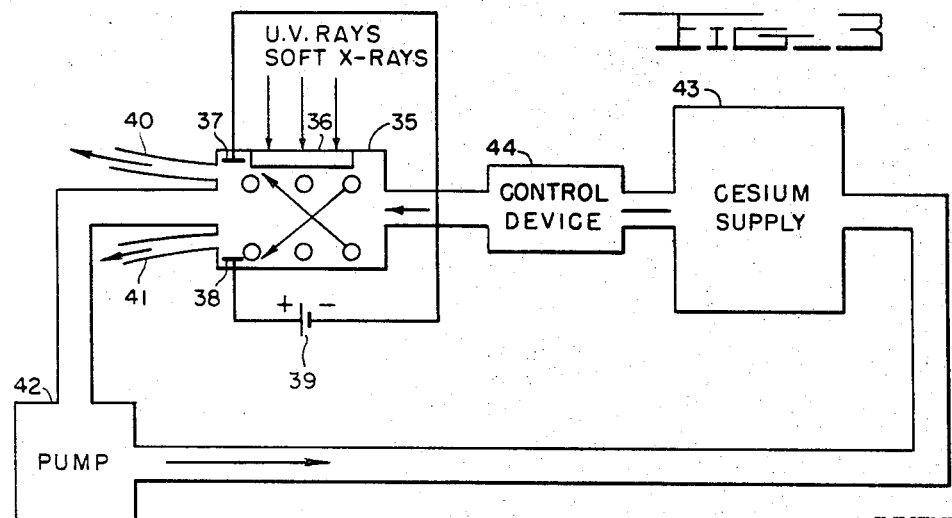

United States Patent Office 3,416,319
Patented Dec. 17, 1968

3,416,319
PROPULSION SYSTEM
Albert M. Rubenstein, 2709 Navarre Drive,
Chevy Chase, Md. 20015
Filed Aug. 20, 1959, Ser. No. 835,151
5 Claims. (Cl. 60—202)

The invention described herein may be manufactured and used by or for the Government of the United States of America for governmental purposes without the payment of any royalties thereon or therefor.

This invention relates to the extraction of energy from radiation such as that existing in space or emitted from the sun and other sources of similar radiant energy and more particularly to the operation of vehicles in interplanetary space.

The operation of vehicles in space poses a considerable problem because of the fact that during the necessarily lengthy periods of operation involved in interplanetary travel considerable power must be available not only for propulsion of the vehicles but also for the operation of auxiliaries such as pumping devices of various forms, electrical devices including communication systems and object locator systems, and devices involved in the preservation of food stuffs, habitable atmospheres and the like. To obtain such power by the normal combustion processes used on earth is impractical because of the large quantities of fuel and oxygen required for a prolonged period of space travel. Other power sources such as atomic energy sources are not subject to such limitations of weight of raw materials involved, however they do pose other problems in the form of shielding requirements, component size and weight, and other safety aspects which render them not altogether desirable for prolonged space operation of auxiliary units.

The sun and other similar celestial bodies provide considerable radiation energy in the form of ultraviolet rays and soft X-rays, and infrared radiation in interplanetary space where the shielding effects of the planetary atmosphere are not present, as well as the visible radiation which reaches the surfaces of the planets. However, prior art methods for the extraction and utilization of such energy have not been particularly desirable or practical, usually requiring the conversion of solar infrared radiation into some intermediate energy form which offers many additional problems such as steam which in turn is utilized to drive mechanical devices to produce electrical energy. A more direct method for the production of electrical energy from solar radiation is much more desirable because of the possibility of reduction in weight and volume of associated equipment without consumption of fuel, oxidant, or other raw materials to provide energy.

Accordingly, it is an object of the present invention to provide apparatus capable of transforming solar radiant energy into propulsion energy.

Another object of the present invention is to provide a simplified propulsion system for a space vehicle.

Another object of the present invention is to provide apparatus for utilizing solar radiant energy to propel a vehicle in space with benefit of high specific impulse and provide power for the operation of auxiliary equipment located on such vehicle.

Other and further objects and features of the present invention will become apparent from a careful consideration of the following description and the accompanying drawings wherein:

FIG. 1 indicates in block form an overall system for the conversion of solar radiation into electrical energy which can be used for further extraction of energy from solar radiation to derive propulsive forces for a space vehicle.

FIG. 2 shows in a general way details of the power converter of FIG. 1 by means of which solar radiant energy is converted into electrical energy.

FIG. 3 shows details of how relatively small quantities of electrical energy as can be produced by power converters such as those of FIG. 2 are employed to produce propulsive forces suitable for propelling a vehicle through space.

Figure 1:
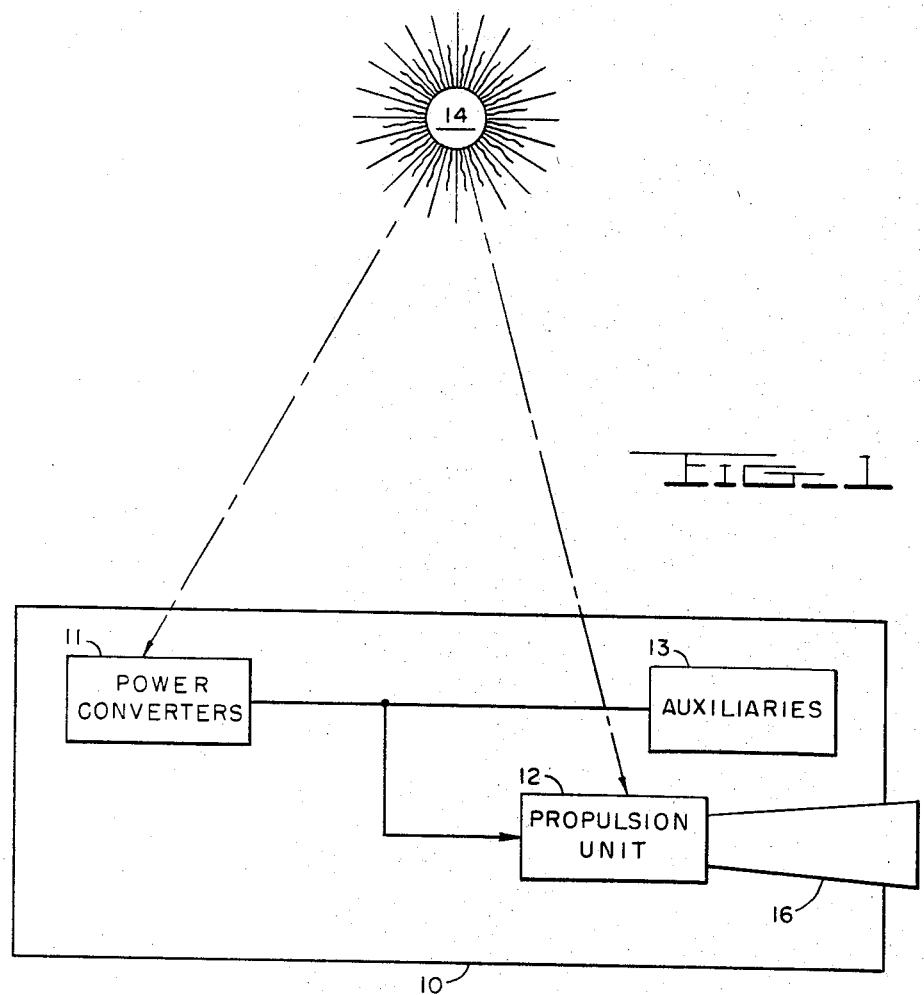

In accordance with the basic teachings of the present invention, utilization is made of properties of a material such as cesium, in particular that of being ionized in the vapor state by celestial radiation. Ionized cesium is used for the production of electrical energy which in turn is utilized to produce acceleration of other cesium ions which are emitted at high velocity from the vehicle to produce propulsion thereof. In the production of electrical energy by the ionization of cesium, a container of cesium vapor is employed having a window therein which is readily penetrated by solar radiation but not by the cesium. The cesium is ionized by such radiation and the resulting charged particles are subjected to accelerating fields by means of which the ions of cesium are separated from the electrons, and are separately collected to provide charging of an energy storage device. The pressure within the cesium container is selected to provide an optimum balance between availability and mobility of cesium ions. A pressure of .001 millimeter is typical as set forth in my copending application Ser. No. 835,150 filed Aug. 20, 1959. A plurality of such power converters can be employed connected in series or series-parallel combinations to produce higher potentials or currents than are available from a single generator, where such is desirable.

With high potentials thus available from the power converters described in the foregoing paragraph, a propulsion chamber also containing cesium vapor and having a window permitting the entry of solar radiation is used to provide ionized cesium, which is then subjected to accelerating fields produced by the electrical energy from the power converters, possibly being assisted by magnetic fields from permanent magnets or electromagnets with the high velocity cesium ions being expelled from the space vehicle in a direction opposite to that desired for vehicle motion. The propulsion results primarily from the reactive forces from the acceleration of the cesium ions, substantially no significant force being derived from the expulsion of cesium due to any non-electrical or non-magnetic pressure head. It is thus possible to achieve propulsion of a space vehicle with small quantities of cesium providing high specific impulse. Quantities on the order of pounds are adequate for space propulsion between the planets of the solar system.

With reference now to FIG. 1 of the drawings, the overall apparatus shown therein is a somewhat schematic representation of a space vehicle 10 containing a plurality of power converters 11 and a propulsion unit 12 with outlet nozzle assembly 16 together with auxiliary units 13 which may typically be fluid moving devices, electrical communication systems or the like. The power converters 11 and the propulsion unit 12 include suitable cesium containing enclosures with portions thereof which are transparent to solar radiation but not to the cesium. In the operation of this device of FIG. 1 therefore the radiant energy from the sun 14 provides ionization of cesium within the power converters 11 and the propulsion unit 12, the power converters 11 providing electrical power to operate the auxiliaries 13 as well as to provide accelerating fields for the propulsion unit 12.

With reference now to FIG. 2 of the drawing, the mild mechanical treatment may, for instance, consist of striking, rubbing, brushing, or vibrating. Such treatment during the electrical treatment will not only fold out but also spread the material out.

At this point in the flow sheet of FIGURE 1 the sheet material is in a spread-out condition wherein the individual fibrils, making up the material, are parallel to the longitudinally axis of the sheet material. In many cases, and for many applications, this is a desirable configuration. However, for certain textile products the yarn used in the manufacture therein should not be lean and smooth but rather should have a high percentage of loose fibrils along the surface of the web or sheet as the case may be. For instance, in the case of blankets, carpets, and fabrics made from woolen yarns, it is essential to use a bulky yarn which is not produced under the process described in the above-identified patent.

My invention resides in forming a pile fabric from this polymeric sheet material as it emerges from the folding-out step.

With reference to FIGURES 2 and 3, after the sheet material 10 has been folded out as described hereinabove, it passes between a pair of generally cylindrical rollers 12 and 13, which are rotatably mounted in frame plates 14 and 16 respectively. These frame plates 14 and 16 extend vertically from a base plate 18 which is mounted on wheels 20. This unit is able to be wheeled into a position to receive the film 10 directly from the folding-out step described in FIGURE 1 in the event that it is desirable to make the whole process continuous. The sheet or web 10 passes from the rollers 12 and 13 to a roller 54 (see FIGURE 6) which is also rotatably mounted in plates 14 and 16.

With reference to FIGURE 6, a plurality of rollers 54 are shaped to form a crown 56 at their centers. As a result, the fibrils in the central portion of film 10 passing over the crown 56 will break while those in the edge portion of the film passing over the edge of the roller will not. This action of crowned rollers 54 (FIGURE 2) causes the fibrils in the center portion of sheet 10 to break. This web is particularly useful in making yarn and as such it is twisted by conventional yarn twisting means as it is wound onto a spool 58.

As shown in FIGURES 2 and 3, rollers 13, 54 (only one roller is shown; however, it would be within the skill of the art to connect a plurality of crowned rollers into the mechanism) and 29 are connected to a suitable driving mechanism 30. This mechanism comprises an endless belt or chain 32 which passes over a pulley or sprocket 34 which is fixed to roller 54, then over a sprocket 36 which is fixed to roller 13, then over a sprocket 38 which is fixed to roller 29, then over an idler sprocket 40, then over a drive sprocket 42, which is driven by any suitable power source such as electric motor 44, and finally back over sprocket 34. The rollers 12, 13, 54, 28, and 29 are rotated in the directions shown by the arrows.

With reference to FIGURE 4, roller 22 is provided with a plurality of grooves 24 and a plurality of needles 26 or other similar sharp, pointed implements, which project radially from the center of the grooves 24. These needles may be secured in the grooves 24 in any suitable manner. As the sheet 10 passes over the roller 22, portions of it are channelled into the grooves 24 and become impaled upon the needles which penetrate through the sheet material and cause a portion of the individual fibrils to be severed. The degree of breakage would be determined by the number of grooves in the roller and the number of pins in the grooves; however, no more than one-half of the fibers passing over the roller should be broken in order to retain sufficient web strength. In the preferred embodiment we show only one roller but it would be within the skill of the art to adapt a plurality of rollers over which the film could be passed. The film after passing over the pin-studded roller 22 is received by a pair of pick-up rollers 28 and 29 which are also rotatably mounted in the frame plates 14 and 16. These rollers feed the bulky sheet material to a suitable take-up mandrel (not shown).

FIGURE 5 illustrates another embodiment of my invention. In this embodiment a roller 46 contains a plurality of grooves 48 around the perimeter thereof. These grooves are cut at an angle of 45° to the horizontal axis 50 of the roller 46. This roller 46 is attached to frames 14 and 16 in place of roller 22. A plurality of knife blades 52 are positioned around the circumference of roller 53 rotatably mounted between the vertical frames 14 and 16 a predetermined distance from roller 46. The sheet 10 is passed between the roller and the blade. The blade 52 is rotated in close enough proximity to the roller 46 so that portions of the film 10 pass over the crown of the grooves 48 and are cut by the rotating blades 52. Because of the angle of inclination of these grooves a discontinuous chopping of the individual fibrils results without cutting entirely across the sheet itself. The strength of the sheet itself is not significantly affected. This fabric possesses a tremendous advantage over a normal pile fabric because the pile fibers form an integral part of the sheet and are firmly anchored to the surface of the sheet.

In order to illustrate with greater particularity and clarity the operation of my process, the following examples are offered as illustrative of the operation thereof. The specific materials and conditions given in the examples are presented as being typical and should not be construed to limit my invention unduly.

EXAMPLE I

A 60-inch wide fibrillated web of 0.8 mil polyethylene, having a density of 0.95 gram/cc. and a melt index of 0.3 (ASTM D 1238–5DT, Condition E), is threaded through the machine described in FIGURE 2. A chopper roller 53 is provided with 12 tempered spring steel blades 52 around its circumference. The blades 52 coact with a 12-inch diameter grooved roller 46, made of mild steel and coated to a thickness of 60 mils with 80 durometer rubber. Each groove 48 in roller 46 defines an ellipse in a plane making a 45° angle with the roller axis. These grooves are $\frac{1}{8}$-inch wide, $\frac{1}{8}$-inch deep, and spaced so that their centers are $\frac{1}{4}$-inch apart, and having all their edges and corners chamfered and rounded on a $\frac{1}{16}$-inch radius. Bulk film is fed to roller 12 at the rate of 20 feet per minute while the machine is being adjusted to insure clean, uniform cuts. After adjustment, the rate is increased to 150 feet per minute and about 2000 feet of the material is fed through the machine.

Air filters 2½ feet square are produced from some of this material by laminating 21 layers of this bulked film together, each layer being laid at right angles to the adjacent layers 21 and being stitched together in both directions across the film at 6-inch intervals with cotton string and subsequently edged with an aluminum channel having a $\frac{1}{8}$-inch flange.

In another application ten 8-foot sections of this bulked fibrilated web are stitched together on 4-inch centers both lengthwise and crosswise and the edges bound to make an exceptionally warm, lightweight blanket.

Example II

The rollers 46 and 53 are replaced with a 12-inch diameter pin-studded roller 22 similar to that shown in FIGURE 4. The grooves 24 are ½-inch center-to-center with a sharp 60° included angle peak between the grooves. In each groove 36 equally spaced cylindrical pins 26 are positioned wherein each pin is $\frac{3}{32}$-inch in diameter and has a flat, sharp edged top portion located $\frac{3}{32}$-inch below the peaks. Web material similar to that used in Example I is threaded through the machine and the machine is started and run at an initial rate of about 15 feet per minute output while adjustments of the film tension over the pin-studded roller 22 are made. After adjustment, the rate is increased to 150 feet per minute to produce approximately to provide control over the amount of cesium vapor entering device 35. This also can be utilized as a "throttle." Device 44 may utilize known valving techniques or cooperate with temperature regulation of the cesium supply vaporizing system of 43.

The cesium supply tank 43 may include if desired a suitable vaporizing system to convert the cesium into vapor for use by the ionization mechanism within device 35. Such vaporization may be facilitated by extracting radiation from the sun's rays or some other source, such as described by Stuhlinger in "Possibilities of Electrical Space Ship Propulsion," Fifth IAF Congress, August 1954, p. 108, heat thus obtained being used to heat a boiler containing cesium.

There is sufficient energy in the solar spectrum in space, typically of the order of 100 miles from the earth, to provide operation of the apparatus as described in the foregoing. With such an arrangement small quantities of cesium can provide adequate interplanetary driving force, quantities of the order of pounds being adequate to provide the propulsion required at velocities to give shorter transit times between the planets of the solar system, or any region in space where celestial bodies emit radiation in suitable quantity to ionize materials such as cesium. Thus in the overall system the sun's radiation is employed to provide the ionized particles as well as the accelerating potentials for the propulsion unit 12, such accelerating potential being indicated in FIG. 3 in a general manner as that obtained from the device 39.

Obviously many modifications and variations of the present invention are possible in the light of the above teachings. It is therefore to be understood that within the scope of the appended claims the invention may be practiced otherwise than as specifically described.

What is claimed is:

1. Apparatus for propelling a vehicle in space with energy obtained from radiation existing in free space from a source independent of said vehicle comprising, a chamber having an aperture for the escape of high velocity charged particles of matter and a portion which will admit the radiation, a fluid material within said chamber which is readily ionized by the radiation to produce positive and negative charged particles within said chamber, means for supplying said material to said chamber in fluid form, and means for accelerating the charged particles within said chamber to a high velocity whereby said charged particles escape through the aperture in one general direction, causing a reactive force upon the chamber in the opposite direction.

2. Apparatus for propelling a space vehicle with energy obtained from radiation existing in free space from a source independent of said vehicle comprising, a chamber having an aperture for the escape of high velocity charged particles of matter and a portion which will admit the radiation, means for supplying ionizable cesium vapor into said chamber whereby interaction in said chamber of said radiation and said ionizable vapor produces ionization thereof into charged particles, and means for accelerating the charged particles within said chamber to a high velocity whereby said charged particles escape through the aperture in one general direction, causing a reactive force upon the chamber in the opposite direction.

3. Apparatus for propelling a space vehicle with energy obtained from radiation existing in free space from a source independent of said vehicle comprising, a chamber having an aperture for the escape of high velocity charged particles of matter and a portion which will admit the radiation, a fluid material within said chamber which is readily ionized by the radiation to produce positive and negative charged particles within said chamber, means for supplying said material to said chamber in fluid form, and means for accelerating the charged particles within said chamber to a high velocity whereby said charged particles escape through the aperture in one general direction causing a reactive force upon the chamber in the opposite direction, said means for accelerating the charged particles within said chamber including means for producing electrical energy from the radiation.

4. Apparatus for propelling a space vehicle with energy obtained from radiation existing in free space from a source independent of said vehicle comprising, a chamber having an aperture for the escape of high velocity charged particles of matter and a portion which will admit the radiation, a material which is readily ionized by the radiation to produce positive and negative charged particles within said chamber, means supplying said material to said chamber in fluid form, and means for accelerating the charged particles within said chamber to a high velocity whereby said charged particles escape through the aperture in one general direction causing a reactive force upon the chamber in the opposite direction; said means for accelerating including a power source comprising, an enclosed chamber, said chamber having a portion thereof which will admit the radiation, a material which is readily ionized by the radiation to produce mobile positive and negative charged particles contained within said enclosures, and means for separately collecting the positive and negative charged particles.

5. Apparatus for propelling a space vehicle with energy obtained from radiation existing in free space from a source independent of said vehicle comprising, a chamber having an aperture for the escape of high velocity charged particles of matter and a portion which will admit the radiation, a fluid material within said chamber which is readily ionized by the radiation to produce positive and negative charged particles within said chamber, means for supplying said material to said chamber in fluid form, and means for accelerating the charged particles within said chamber to a high velocity whereby said charged particles escape through the aperture in one general direction causing a reactive force upon the chamber in the opposite direction, said means for accelerating the charged particles within said chamber including means for producing an electrostatic field.

References Cited

UNITED STATES PATENTS 2,880,337   3/1959   Langmuir et al. _____ 60—35.5

OTHER REFERENCES

Stehling, Aviation Age, vol. 28, No. 7, Jan. 1, 1958, pp. 38, 39, 40, 42 and 43.

Lossing et al., The Journal of Chemical Physics, vol. 25, No. 5, November 1956, pp. 1031–1034.

Watanabe et al., Physical Review, vol. 91, No. 5, Sept. 1, 1953, pp. 1155 to 1158.

Electronics, vol. 32, No. 17, Apr. 24, 1959, pp. 69, and 78–80.

IRE Transactions on Military Electronics, vol. MIL3, No. 2, April 1959, pp. 27–33, 46–51.

RODNEY D. BENNETT, *Primary Examiner.*

D. C. KAUFMAN, *Assistant Examiner.*

U.S. Cl. X.R.

313—161